US009597736B2

(12) United States Patent
Steele et al.

(10) Patent No.: US 9,597,736 B2
(45) Date of Patent: Mar. 21, 2017

(54) ADJUSTABLE DIAMETER HOLE CUTTER

(71) Applicant: Milwaukee Electric Tool Corporation, Brookfield, WI (US)

(72) Inventors: Michael S. Steele, Waukesha, WI (US); Robb Dennert, Waukesha, WI (US); Bryan C. Ward, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 76 days.

(21) Appl. No.: 14/577,055

(22) Filed: Dec. 19, 2014

(65) Prior Publication Data
US 2015/0174670 A1    Jun. 25, 2015

Related U.S. Application Data

(60) Provisional application No. 61/918,298, filed on Dec. 19, 2013.

(51) Int. Cl.
*B23B 51/05*    (2006.01)

(52) U.S. Cl.
CPC .......... *B23B 51/05* (2013.01); *B23B 2251/54* (2013.01); *B23B 2251/606* (2013.01);
(Continued)

(58) Field of Classification Search
CPC . B23B 5/05; B23B 2251/54; B23B 2251/606; B23B 2270/30; Y10T 408/21;
(Continued)

(56) References Cited

U.S. PATENT DOCUMENTS 25,348 A * 9/1859 Pennie .................... B23B 51/05
                                                 408/153
168,607 A * 10/1875 Brule ..................... B23B 51/05
                                                 408/147
(Continued)

FOREIGN PATENT DOCUMENTS

CN          2451296        10/2001
CN         201049483        4/2008
(Continued)

OTHER PUBLICATIONS

Amazon, "Adjustable Circle Hole Cutter" <http://www.amazon.com/generic-adjustable-circle-hole-cutter/dp/b0006b4pm2> webpage publicly available prior to Dec. 19, 2013.
(Continued)

*Primary Examiner* — Eric A Gates
*Assistant Examiner* — Donte Brown
(74) *Attorney, Agent, or Firm* — Michael Best & Friedrich LLP

(57) ABSTRACT

A hole cutter assembly is operable to cut a plurality of different sized diameter holes in a work piece. The hole cutter assembly includes an arbor configured to connect to a power tool for rotation about an axis, and a body coupled to the arbor for rotation with the arbor. The body defines an aperture. The hole cutter assembly includes a drill bit removably received in the aperture of the body for rotation with the arbor, an arm moveably coupled to the body, and a cutting blade coupled to the arm and moveable with the arm relative to the body. The arm is moveable relative to the body to adjust a cutting diameter of the hole cutter assembly when the drill bit is not received within the aperture. The arm is fixed relative to the body when the drill bit is received within the aperture.

5 Claims, 6 Drawing Sheets

(52) U.S. Cl.
CPC ....... *B23B 2270/30* (2013.01); *Y10T 408/375* (2015.01); *Y10T 408/50* (2015.01); *Y10T 408/895* (2015.01)

(58) Field of Classification Search
CPC ........... Y10T 408/895; Y10T 408/8957; Y10T 408/50
See application file for complete search history.

(56) References Cited

U.S. PATENT DOCUMENTS

| | | | |
|---|---|---|---|
| 209,726 A * | 11/1878 | Tilton | B23B 51/05 408/147 |
| 268,509 A * | 12/1882 | Maltby | B23B 51/05 279/77 |
| 296,219 A * | 4/1884 | Rath | B23B 51/05 147/36 |
| 310,527 A * | 1/1885 | Koepka | B23B 51/05 408/147 |
| 703,538 A | 7/1902 | Cartwright | |
| 1,246,925 A * | 11/1917 | Hunt | B23B 51/05 33/27.03 |
| 1,308,650 A * | 7/1919 | Wilson | B23B 51/05 30/300 |
| 1,449,790 A | 3/1923 | Sprague | |
| 1,661,136 A * | 2/1928 | Endrezze | B23B 51/05 408/189 |
| 1,785,395 A * | 12/1930 | Shaw | B23Q 17/22 33/613 |
| 2,225,224 A * | 12/1940 | Landrum | B23B 51/05 408/185 |
| 2,406,442 A * | 8/1946 | Smith | B23B 51/05 408/190 |
| 2,411,697 A * | 11/1946 | Smith | B23B 51/05 408/186 |
| 2,427,011 A | 9/1947 | London | |
| 2,463,063 A | 3/1949 | Smith | |
| 2,482,439 A | 9/1949 | Smith | |
| 2,546,292 A * | 3/1951 | Bell | B23B 51/05 30/300 |
| 2,556,240 A | 6/1951 | Valentine et al. | |
| 2,618,991 A | 11/1952 | Charles | |
| 2,618,992 A | 11/1952 | Charles | |
| 2,628,512 A | 2/1953 | Lankford | |
| 2,722,856 A | 11/1955 | Dixon | |
| 2,778,108 A * | 1/1957 | Welsh | B23B 51/05 30/300 |
| 2,803,153 A | 8/1957 | Golbeck | |
| 2,906,145 A * | 9/1959 | Morse | B23B 51/05 408/181 |
| 3,153,885 A | 10/1964 | Keller et al. | |
| 3,357,282 A | 12/1967 | Liberman | |
| 3,436,871 A | 4/1969 | Schneider et al. | |
| 3,802,520 A | 4/1974 | Whitman | |
| 3,877,833 A | 4/1975 | Thornton et al. | |
| 4,077,737 A | 3/1978 | Morse | |
| 4,395,168 A | 7/1983 | Vicari | |
| 4,593,467 A | 6/1986 | Safar | |
| 4,911,051 A | 3/1990 | Depetris | |
| 4,966,502 A | 10/1990 | Magyari | |
| 5,079,843 A | 1/1992 | Shelton et al. | |
| 5,236,290 A | 8/1993 | Mittleman et al. | |
| 5,413,437 A | 5/1995 | Bristow | |
| 5,417,526 A | 5/1995 | Stöck et al. | |
| 5,466,099 A | 11/1995 | Sullivan et al. | |
| 5,597,274 A | 1/1997 | Behner | |
| 5,613,811 A | 3/1997 | Tillemans | |
| 5,895,183 A | 4/1999 | McDaniel et al. | |
| 5,910,202 A | 6/1999 | DeMarc | |
| 6,120,220 A | 9/2000 | Speare | |
| 6,193,448 B1 | 2/2001 | Brennan | |
| 6,206,616 B1 | 3/2001 | Smith et al. | |
| 6,227,188 B1 | 5/2001 | Tankala et al. | |
| 6,457,915 B1 * | 10/2002 | Kao | B23B 51/05 408/204 |
| 6,599,063 B1 | 7/2003 | Capstran | |
| 6,786,684 B1 | 9/2004 | Ecker | |
| 6,814,527 B1 | 11/2004 | Fleming | |
| 6,893,194 B2 | 5/2005 | Jones et al. | |
| 6,935,940 B2 | 8/2005 | Skeem et al. | |
| 6,948,574 B2 | 9/2005 | Cramer et al. | |
| 7,001,116 B2 | 2/2006 | Kozak | |
| 7,160,064 B2 | 1/2007 | Jasso | |
| 7,264,428 B2 | 9/2007 | Cossette | |
| 7,384,222 B2 | 6/2008 | Chao | |
| 7,614,395 B2 | 11/2009 | Perry | |
| 7,658,576 B1 | 2/2010 | Buzdum et al. | |
| 7,674,078 B1 | 3/2010 | Bazdum et al. | |
| 7,766,583 B2 | 8/2010 | Kozak | |
| 7,818,867 B1 | 10/2010 | Capstran et al. | |
| 7,901,164 B2 | 3/2011 | Skradski et al. | |
| 7,938,600 B1 | 5/2011 | Griep et al. | |
| 7,967,535 B2 | 6/2011 | Eiserer et al. | |
| 8,579,554 B2 | 11/2013 | Novak et al. | |
| 8,579,555 B2 | 11/2013 | Novak et al. | |
| 2004/0042861 A1 | 3/2004 | Capstran | |
| 2004/0141820 A1 | 7/2004 | Mikon et al. | |
| 2005/0105981 A1 | 5/2005 | Byrley et al. | |
| 2006/0101741 A1 | 5/2006 | Rae | |
| 2007/0110527 A1 | 5/2007 | Jasso | |
| 2008/0267725 A1 | 10/2008 | Mills | |
| 2009/0274923 A1 | 11/2009 | Hall et al. | |
| 2010/0080665 A1 | 4/2010 | Keightley | |
| 2010/0329805 A1 | 12/2010 | Cho et al. | |
| 2011/0027030 A1 | 2/2011 | Capstran et al. | |
| 2011/0052340 A1 | 3/2011 | Kozak | |
| 2011/0081214 A1 * | 4/2011 | Santamarina | B23Q 11/0046 408/67 |
| 2012/0183366 A1 | 7/2012 | Stenman | |
| 2012/0230788 A1 | 9/2012 | Bozic et al. | |
| 2013/0022421 A1 | 1/2013 | Markwald et al. | |
| 2013/0039708 A1 | 2/2013 | Stenman | |

FOREIGN PATENT DOCUMENTS

| | | | |
|---|---|---|---|
| CN | 201128014 | 10/2008 | |
| CN | 202398833 | 8/2012 | |
| CN | 202763969 | 3/2013 | |
| CN | 103203488 | 7/2013 | |
| CN | 103213176 | 7/2013 | |
| DE | 8811555 | 10/1988 | |
| DE | 3831046 | 3/1990 | |
| DE | 4406597 | 9/1995 | |
| DE | 4406597 A1 * | 9/1995 | ............. B23B 51/05 |
| DE | 10032966 | 1/2002 | |
| DE | 202008015130 | 1/2009 | |
| DE | 202011001902 | 7/2011 | |
| FR | 332614 A * | 11/1903 | ............. B23B 51/05 |
| FR | 2451252 | 10/1980 | |
| FR | 2704790 | 11/1994 | |
| GB | 225709 | 12/1924 | |
| GB | 228653 | 2/1925 | |
| GB | 230942 | 3/1925 | |
| GB | 601520 | 5/1948 | |
| GB | 681329 | 10/1952 | |
| GB | 1582413 A * | 1/1981 | ............. B23B 51/05 |
| JP | 05318459 A * | 12/1993 | ............. B28D 1/14 |
| JP | H05318459 | 12/1993 | |
| JP | 2006068879 A * | 3/2006 | ............. B23B 51/05 |
| JP | 2009113192 A * | 5/2009 | ............. B23B 51/12 |
| JP | 2010030008 | 2/2010 | |
| JP | 2010030008 A * | 2/2010 | ............. B23B 51/04 |

OTHER PUBLICATIONS

Amazon, "Hole Pro X-230+ Kit: 1-7/8" to 9-1/4" and all fractional sizes between. Infinitely Adjustable Cutter with Twin Tungsten Carbide Blades needs ¼ drill power of a hole saw to quickly cut Plywood Sheetrock Plaster Fiberglass OSB Plastic MDF Hardie Board" <http://www.amazon.com/hole-pro-x-230-kit-fractional/dp/

(56) References Cited

OTHER PUBLICATIONS b001pi8s6o/ref=pd_sim_sbs> webpage publicly available prior to Dec. 19, 2013.
Amazon, "Greenlee 06923 Quick Cutter Adjustable Recessed Hole Saw" <http://www.amazon.com/Greenlee-06923-Cutter-Adjustable-Recessed/dp/B000FCCZGA/ref=sr_1_1?ie=UTF8&qid=1424376757&sr=8-1&keywords=greenlee+06923+quick+cutter+adjustable+recessed+hole+saw> webpage publicly available prior to Dec. 19, 2013.

\* cited by examiner

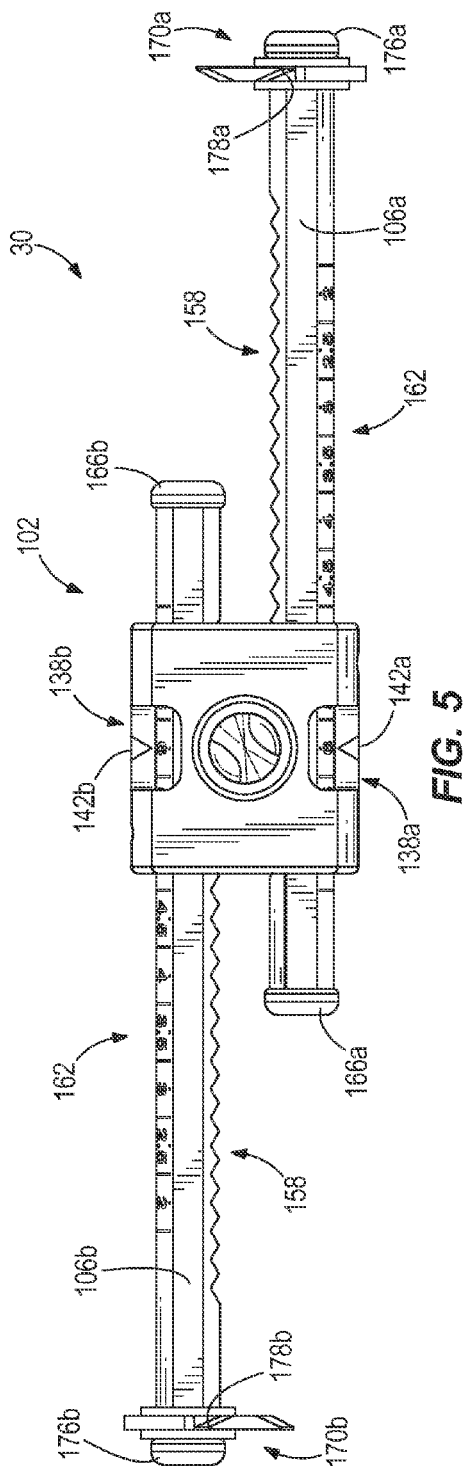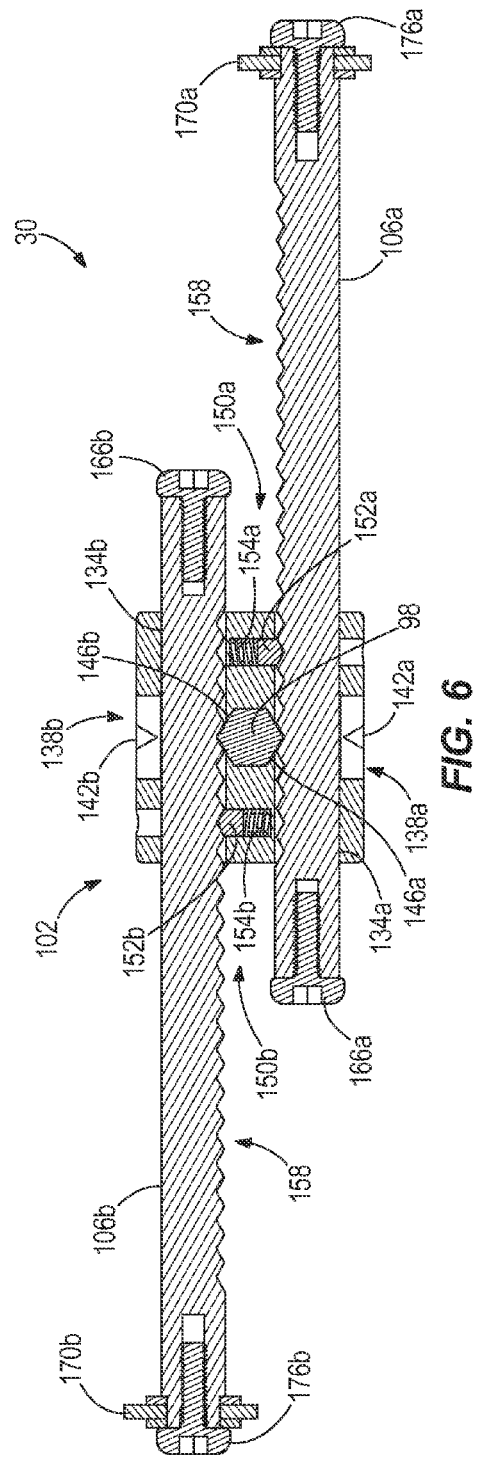

ADJUSTABLE DIAMETER HOLE CUTTER

CROSS-REFERENCE TO RELATED APPLICATIONS

The present application claims priority to U.S. Provisional Patent Application No. 61/918,298, filed Dec. 19, 2013, the entire contents of which are incorporated herein by reference.

BACKGROUND

The present invention relates to hole cutters and, more particularly, to hole cutters having adjustable cutting diameters.

Typically, hole saws or cutters including adjustable cutting diameters require tools (e.g., screwdrivers or Allen wrenches) to enable adjustability of the hole saws. As such, it is time consuming and inefficient to cut a plurality of different sized diameter holes. In addition, accuracy and repeatability of the hole saws are limited by a mechanism that controls the adjustability of cutting different diameters.

SUMMARY

In one embodiment, the invention provides a hole cutter assembly operable to cut a plurality of different sized diameter holes in a work piece. The hole cutter assembly includes an arbor configured to connect to a power tool for rotation about an axis, and a body coupled to the arbor for rotation with the arbor. The body defines an aperture. The hole cutter assembly includes a drill bit removably received in the aperture of the body for rotation with the arbor, and an arm moveably coupled to the body. The arm extends generally perpendicular to the axis. The cutter assembly includes a cutting blade coupled to the arm and moveable with the arm relative to the body. The arm is moveable relative to the body to adjust a cutting diameter of the hole cutter assembly when the drill bit is not received within the aperture. The arm is fixed relative to the body when the drill bit is received within the aperture.

In another embodiment, the invention provides a hole cutter assembly operable to cut a plurality of different sized diameter holes in a work piece. The hole cutter assembly includes an arbor configured to connect to a power tool for rotation about an axis, a body coupled to the arbor for rotation with the arbor, and a first arm moveably coupled to the body. The first arm extends generally perpendicular to the axis. The hole cutter assembly includes a first cutting blade coupled to the first arm and moveable with the first arm relative to the body, and a second arm moveably coupled to the body. The second arm extends generally perpendicular to the axis. The hole cutter assembly includes a second cutting blade coupled to the second arm and moveable with the second arm relative to the body. The first arm and the second arm are oriented generally parallel to each other on opposing sides of the axis.

In yet another embodiment, the invention provides an adjustable hole cutter system operable to cut a plurality of different sized diameter holes in a work piece. The adjustable hole cutter system includes a debris shield assembly having a bowl, and a hub slidably coupled to the bowl. The hole cutter system includes a hole cutter assembly substantially received within the debris shield assembly. The hole cutter assembly is rotatable relative to the debris shield assembly. The hole cutter assembly includes an arbor extending through the hub and configured to connect to a power tool for rotation about an axis, and a body coupled to the arbor for rotation with the arbor. The body defines an aperture that selectively receives the drill bit. The hole cutter assembly includes a drill bit removably received in the aperture of the body for rotation with the arbor, and a first arm moveably coupled to the body. The first arm extends generally perpendicular to the axis. The hole cutter assembly includes a first cutting blade coupled to the first arm and moveable with the first arm relative to the body, and a second arm moveably coupled to the body. The second arm extends generally perpendicular to the axis. The hole cutter assembly includes a second cutting blade coupled to the second arm and moveable with the second arm relative to the body. The first arm and the second arm are moveable relative to the body to adjust a cutting diameter of the hole cutter assembly when the drill bit is not received within the aperture. The first arm and the second arm are fixed relative to the body when the drill bit is received within the aperture.

BRIEF DESCRIPTION OF THE DRAWINGS

FIG. 5 is a plan view of the hole cutter assembly.

FIG. 6 is a cross-sectional view of the hole cutter assembly taken along section line 6-6 of FIG. 4.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
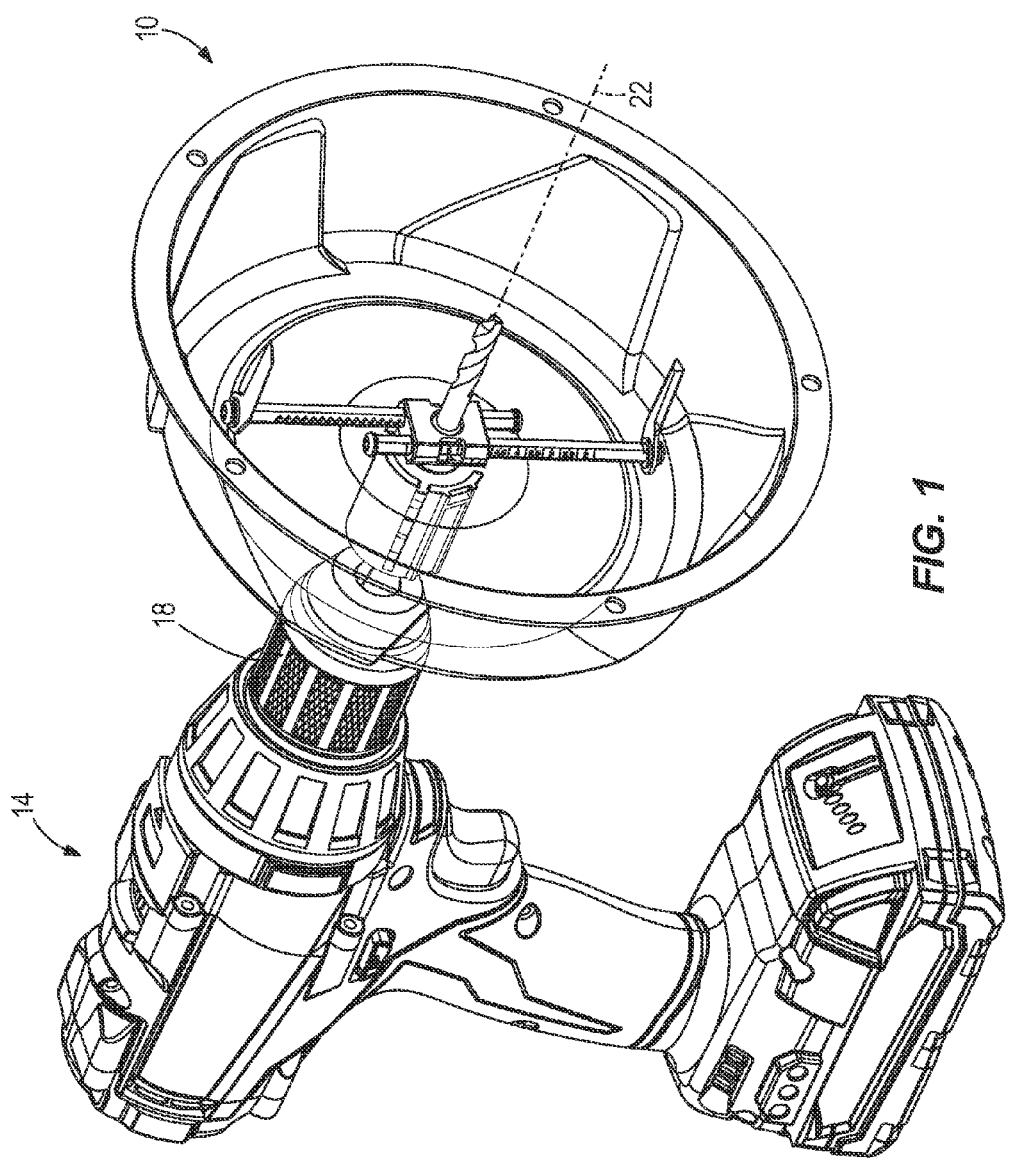
FIG. 1 is a perspective view of an adjustable hole cutter system according to one embodiment of the invention and coupled to a power tool.
Figure 7:
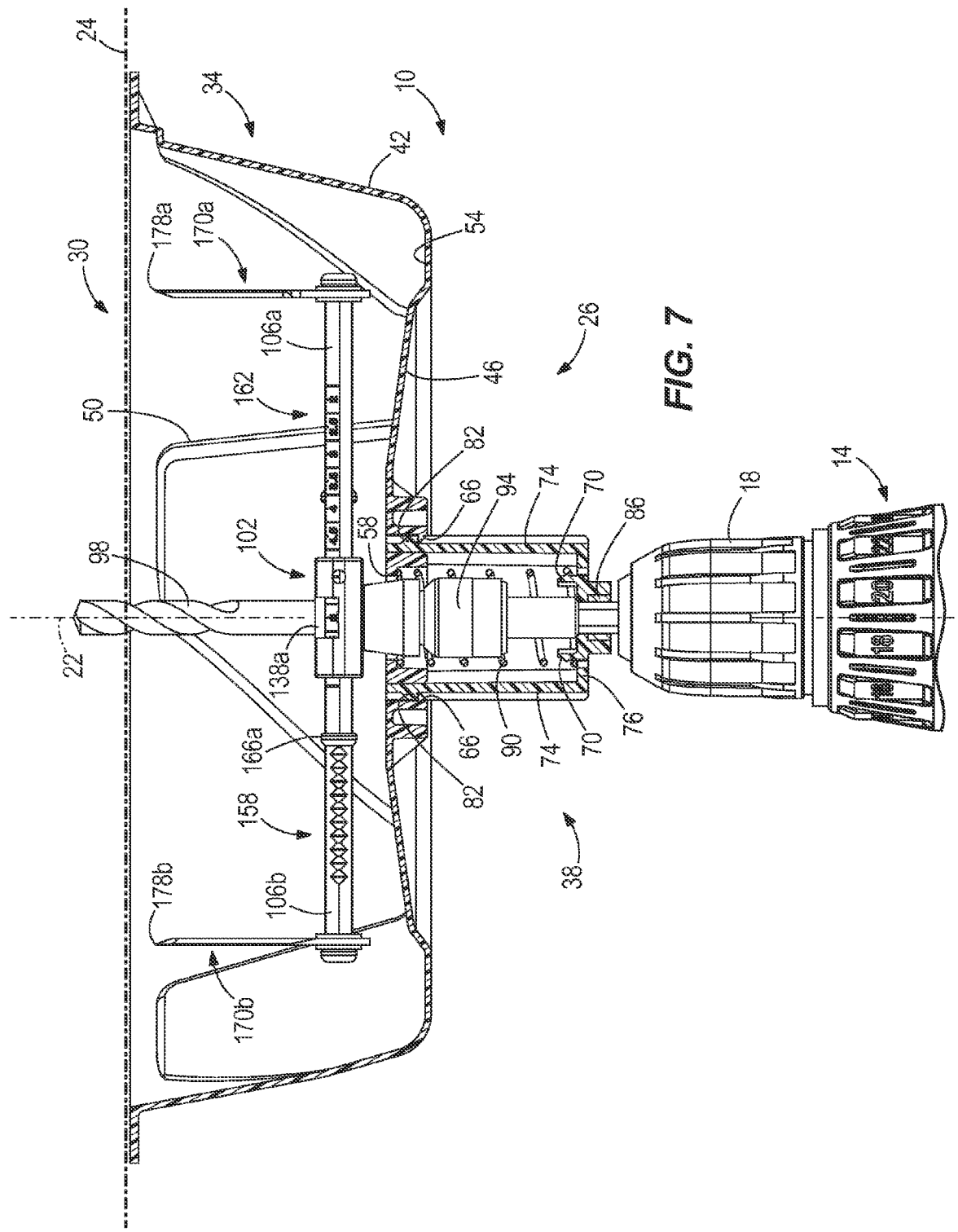
FIG. 7 is a side, partial cross-sectional view of the adjustable hole saw system abutting a work piece.
Figure 8:
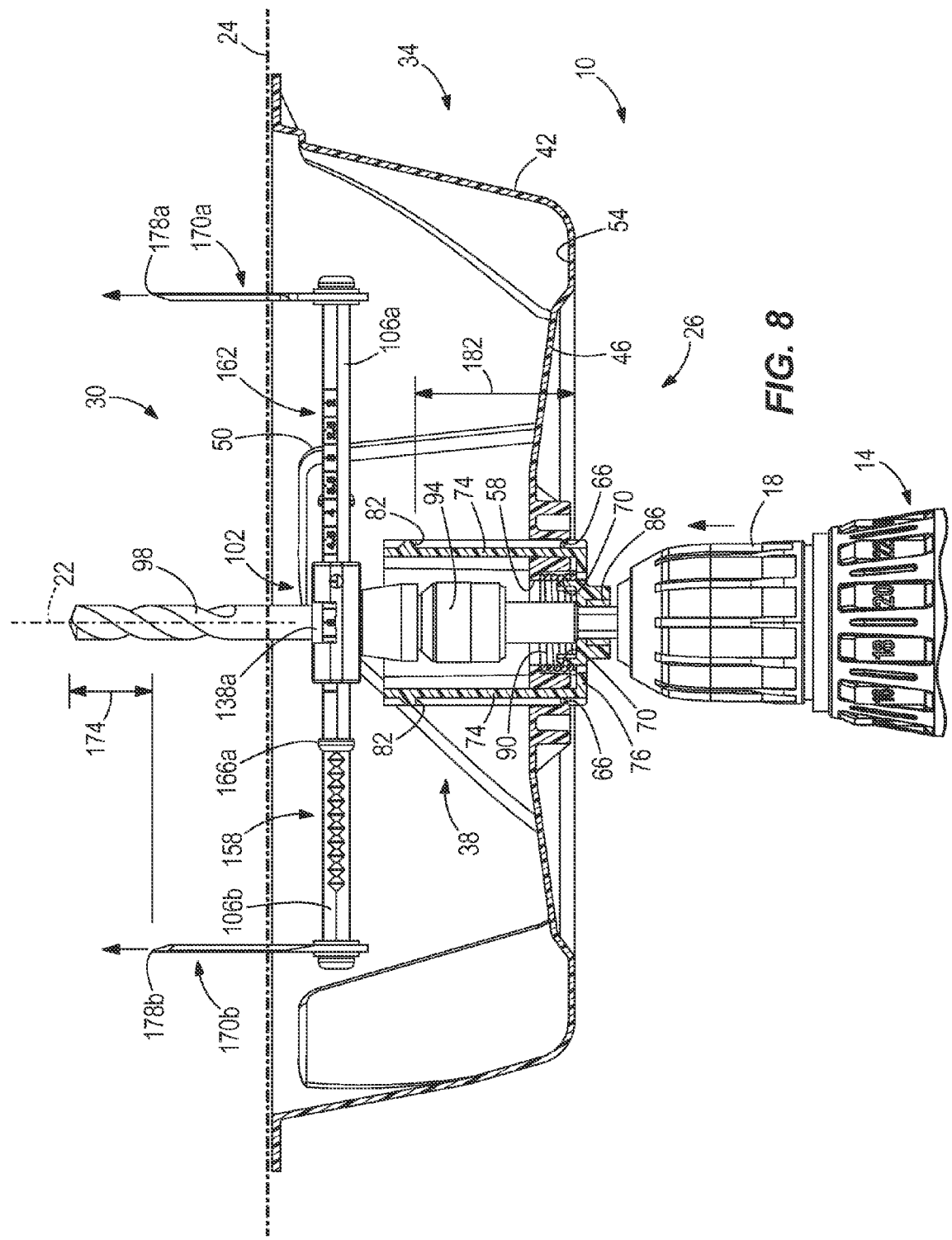
FIG. 8 is a side, partial cross-sectional view of the adjustable hole saw system cutting into the work piece.

FIG. 1 illustrates an adjustable hole cutter system 10 coupled to a power tool 14. In the illustrated embodiment, the power tool 14 is a rotary drill. The adjustable hole cutter system 10 is selectively secured to a drive portion 18 of the power tool 14. The drive portion 18 defines an axis 22 about which the power tool 14 rotates at least a portion of the adjustable hole cutter system 10. The hole cutter system 10 is "adjustable" in that the size (i.e., diameter) of a hole cut using the adjustable hole cutter system 10 may be changed or adjusted to a desired size. In the illustrated embodiment, the adjustable hole cutter system 10 is operable to cut different sized diameter holes within a work piece 24 (FIGS. 7 and 8). In some embodiments, the work piece 24 is dry wall material, but the adjustable hole saw system 10 is also operable to cut holes in a variety of other materials (e.g., plastics, wood, metal, composites, etc.).

Figure 2:
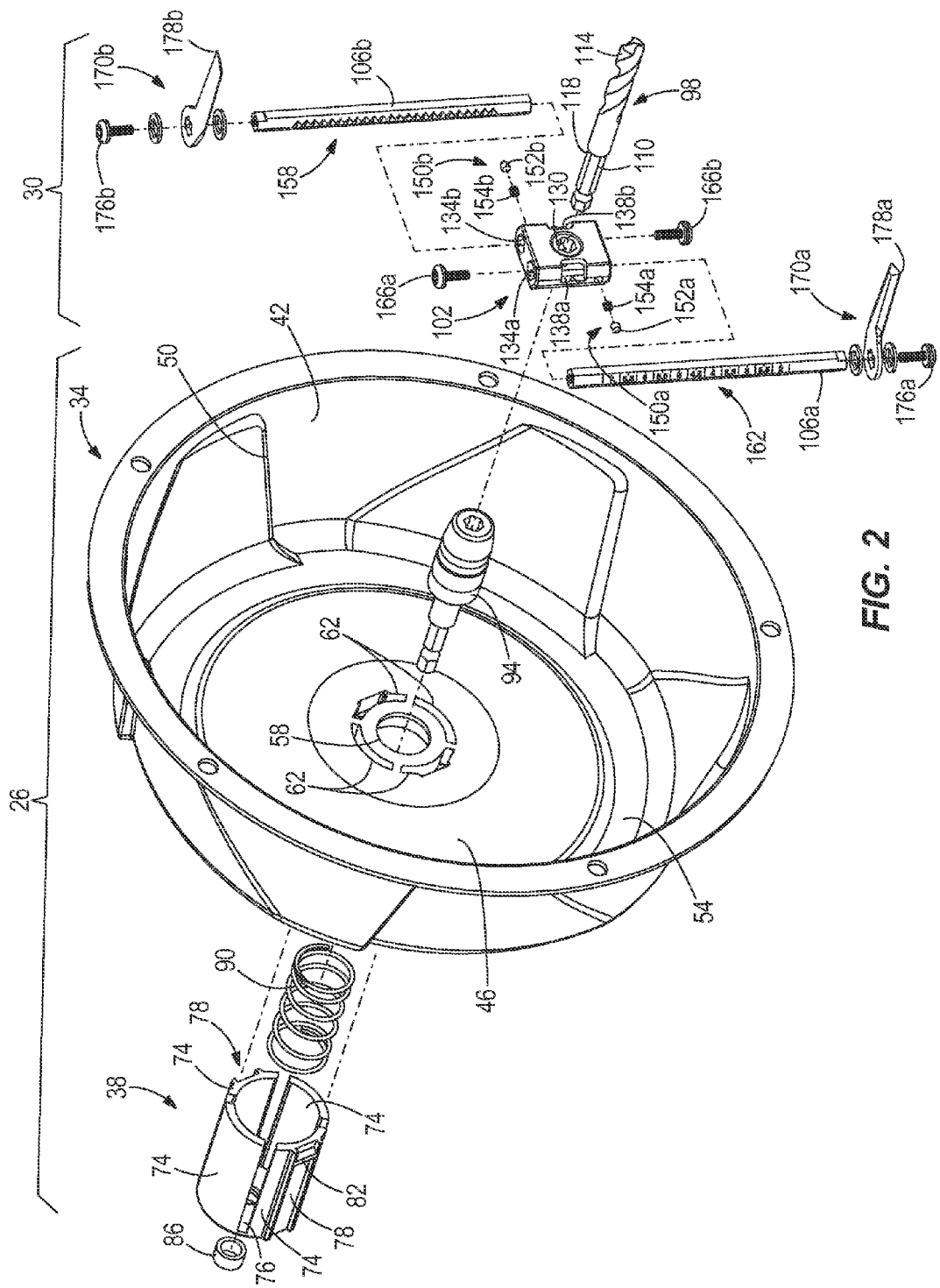
FIG. 2 is an exploded perspective view of the adjustable hole cutter system.

With reference to FIG. 2, the adjustable hole cutter system 10 includes a debris shield assembly 26 and a hole cutter assembly 30. The debris shield assembly 26 and the hole cutter assembly 30 are concentrically aligned about the rotational axis 22.

Figure 3:
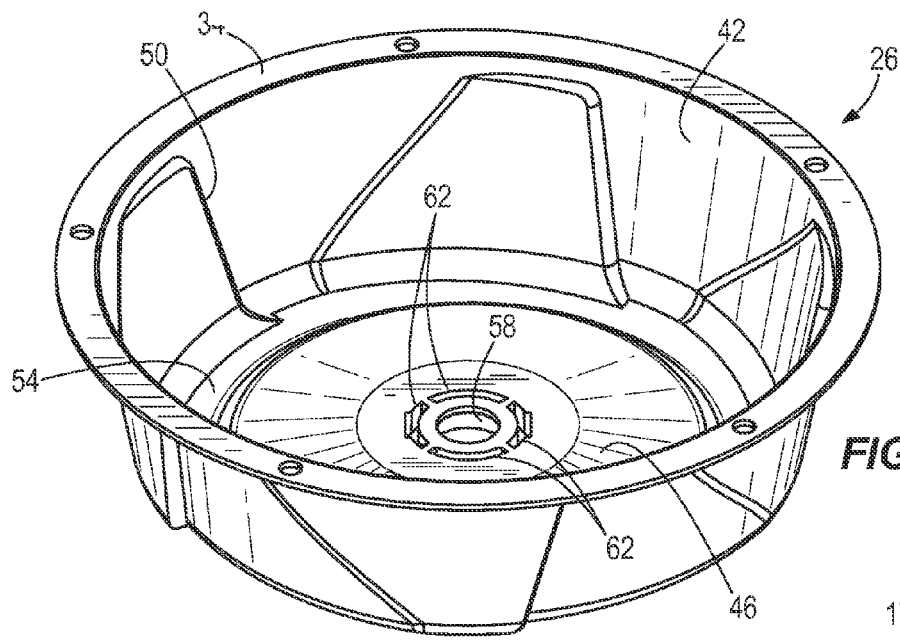
FIG. 3 is a perspective view of a debris shield assembly of the hole cutter system.

The illustrated debris shield assembly 26 includes a bowl 34 and a hub 38. The hub 38 is concentrically aligned with the bowl 34 about the rotational axis 22. With reference to FIG. 3, the bowl 34 is a transparent member constructed from a substantially rigid material (e.g., rigid plastic). The illustrated bowl 34 includes a sidewall 42 and a bottom wall 46. The sidewall 42 includes steps 50 that protrude inwardly within the bowl 34 towards the rotational axis 22. The steps 50 are in communication with the bottom wall 46 and generally extend the entire length (i.e., depth measured generally parallel to the axis 22) of the sidewall 42. In the illustrated embodiment, the steps 50 are orientated at an angle relative to the rotational axis 22 (FIG. 1). In other embodiments, the steps 50 may be orientated generally normal to the rotational axis 22. In addition, the illustrated sidewall 42 includes five steps 50 radially spaced equally apart. For example, adjacent steps 50 are seventy-two degrees apart from each other. In other embodiments, the sidewall 42 may include more or less than five steps 50 such that the radial spacing between the steps 50 is accordingly adjusted.

In reference to FIGS. 2 and 3, the bottom wall 46 includes a channel 54. The channel 54 is a portion of the bottom wall 46 that is recessed (in the direction of the axis 22) relative to the remainder of the bottom wall 46. The illustrated channel 54 defines a circumferential perimeter of the bottom wall 46. In other words, the channel 54 is adjacent the sidewall 42 such that the sidewall 42 is coupled to the bottom wall 46 via the channel 54. The channel 54 is also in communication with the steps 50.

The bottom wall 46 includes a central aperture 58 and radial slots 62 concentrically aligned with the rotational axis 22. In the illustrated embodiment, the bottom wall 46 includes four radial slots 62 adjacent the central aperture 58. With reference to FIGS. 7 and 8, fingers or tabs 66 are defined on two of the radial slots 62 that are diametrically opposed (e.g., the fingers 66 are spaced 180 degrees apart). The fingers 66 also face towards the central aperture 58. In other embodiments, the bottom wall 46 may include more or less than four radial slots 62 and two fingers 66.

With continued reference to FIG. 2, the hub 38 is a hollow, generally cylindrical member having sidewalls 74 extending from an end wall 76. The sidewalls 74 are discrete in that the sidewalls 74 may bend or flex independently of and relative to each other. The sidewalls 74 extend substantially parallel to the rotational axis 22 and are defined by slots between the sidewalls 74. The sidewalls 74 are sized to be received within the radial slots 62 of the bowl 34. In other words, the number of sidewalls 74 is dependent upon the number of radial slots 62. Therefore, in the illustrated embodiment, the hub 38 includes four discrete sidewalls 74. In other embodiments, the hub 38 may include fewer or more sidewalls 74.

The hub 38 also includes a pair of grooves 78 and stops 82 located on opposing sidewalls 74. The grooves 78 extend along most of the length of the sidewalls 74. The stops 82 are located within and generally at an end of the grooves 78. The grooves 78 and the stops 82 correspond to the fingers 66 of the bowl 34. In other words, the number of grooves 78 and stops 82 are dependent upon the number of fingers 66.

The illustrated hub 38 also includes a bushing 86. The bushing 86 is located within the end wall 76. The bushing 86 is concentric with the rotational axis 22. The bushing 86 is sized to be secured within the hub 38 by, for example, a press fit. In the illustrated embodiment, the bushing 86 is made of metal, which includes adequate wear properties.

In addition, the illustrated hub 38 includes a biasing member 90. The biasing member 90 is located within the sidewalls 74. In particular, the biasing member 90 is attached to the end wall 76 near the bushing 86 by protrusions 70 (FIG. 7). In the illustrated embodiment, the biasing member 90 is a compression coil spring. In other embodiments, other types of biasing members may also or alternatively be employed.

Figure 4:
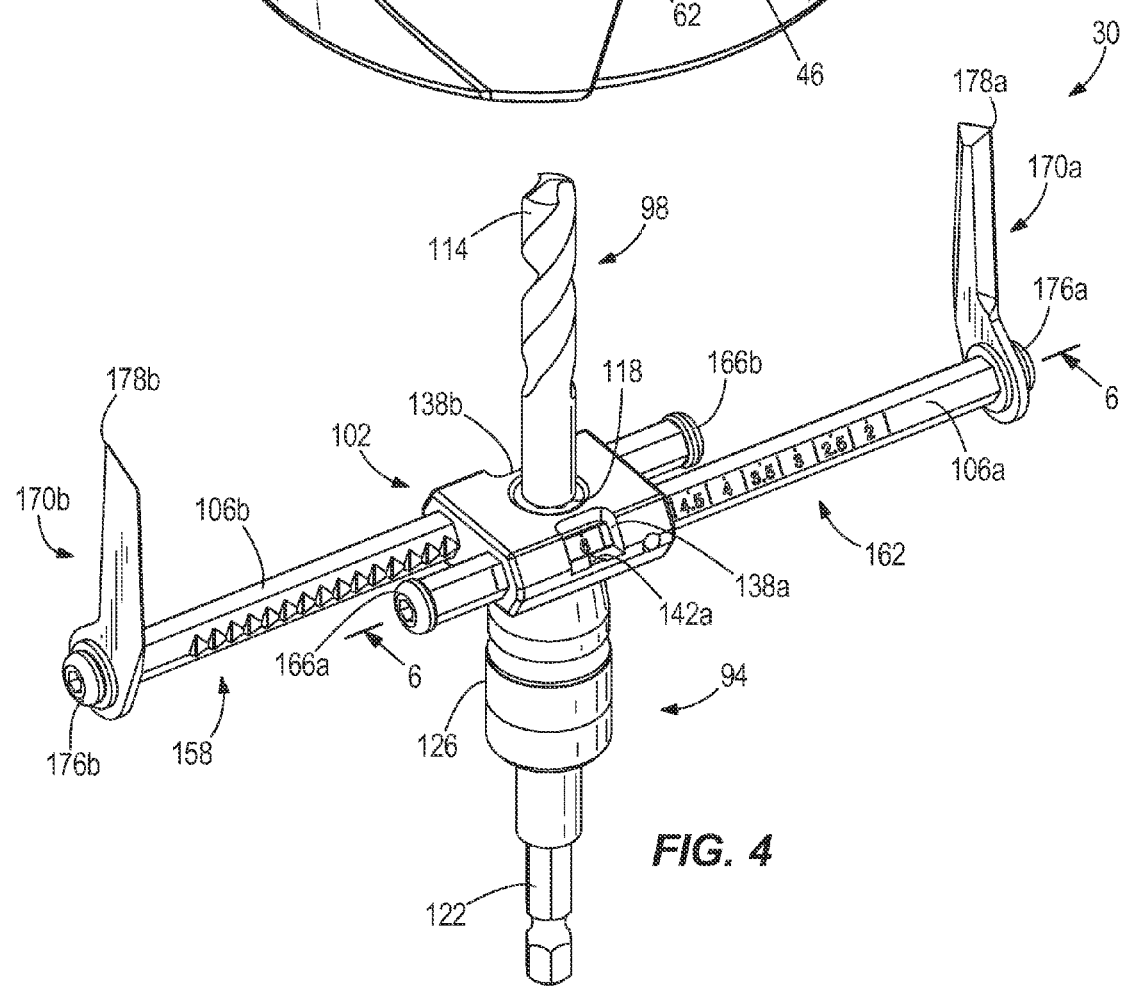
FIG. 4 is a perspective view of a hole cutter assembly of the adjustable hole cutter system.

With reference to FIGS. 2 and 4, the hole cutter assembly 30 includes an arbor 94, a drill bit 98, and a body 102. The drill bit 98 is selectively coupled to the arbor 94 with the body 102 located therebetween. The arbor 94 and the drill bit 98 are concentric with the rotational axis 22. The body 102 is also concentric with the rotational axis 22, but includes portions extending generally perpendicular to the rotational axis 22.

The drill bit 98 includes an attachment end 110 separated from a working end 114 by a shoulder 118 (FIG. 2). In some embodiments, the working end 114 defines a 5/16" drill bit. In other embodiments, different sized drill bits may also be utilized. The attachment end 110 defines a hexagonal shank configured to be received within the arbor 94. In the illustrated embodiment, the drill bit 98 is a twist bit. In other embodiments, the drill bit 98 may be a different type of bit, such as a spade bit.

With reference to FIG. 4, the arbor 94 also includes an attachment end 122 and a working end 126. The attachment end 122 defines a hexagonal shank configured to be received within the drive portion 18 of the power tool 14. The working end 126 is configured to selectively receive the attachment end 110 of the drill bit 98. In the illustrated embodiment, the working end 126 includes a quick connect mechanism. The quick connect mechanism is described in further detail in U.S. Pat. No. 6,561,523, the entire contents of which are incorporated by reference herein.

With reference to FIG. 2, the body 102 defines a central aperture 130 that is concentric with the rotational axis 22, two bores 134a, 134b that are perpendicular to the rotational axis 22, and two windows 138a, 138b. Each window 138a, 138b corresponds to a respective bore 134a, 134b. The central aperture 130 is located within the center of the body 102. In the illustrated embodiment, the central aperture 130 and the bores 134a, 134b have generally hexagonal cross-sections. In other embodiments, the bores 134a, 134b may be differently constructed (e.g., octagonal, triangular, circular, etc.). The bores 134a, 134b extend through the entire length of the body 102 and are located on equally opposing sides of the central aperture 130. In other words, the distance between the central aperture 130 and each bore is the same. The windows 138a, 138b are located on a periphery of the body 102 and are in communication with a respective bore 134a, 134b. The windows 138a, 138b also include pointers 142a, 142b (FIGS. 5 and 6), which indicate generally the center of each window 138a, 138b. In addition, the pointers 142a, 142b are coplanar with the rotational axis 22. Also, the central aperture 130 is orientated on the body 102 such that two opposing points of the six pointed hexagonal-shaped aperture are coplanar with the pointers 142a, 142b and the rotational axis 22.

Furthermore, the body 102 includes openings 146a, 146b that are in communication with the central aperture 130 and the bores 134a, 134b. The openings 146a, 146b are generally aligned with the pointers 142a, 142b (FIG. 6).

With reference to FIG. 6, the body 102 also includes detent assemblies 150a, 150b positioned internally between the bores 134*a*, 134*b*. Each detent assembly 150*a*, 150*b* corresponds to one of the bores 134*a*, 134*b*. Therefore, the detent assembly 150*a* is in communication with the bore 134*a*, and the detent assembly 150*b* is in communication with the bore 134*b*. Each detent assembly 150*a*, 150*b* includes a projection 152*a*, 152*b* and a spring 154*a*, 154*b*. The projections 152*a*, 152*b* are biased towards their respective bores 134*a*, 134*b* by the springs 154*a*, 154*b*.

With reference to FIG. 5, the hole cutter assembly 30 includes two arms 106*a*, 106*b*. The arms 106*a*, 106*b* extend from the body 102 and are perpendicular to the rotational axis 22. The arms 106*a*, 106*b* are slidably received within the bores 134*a*, 134*b*, respectively, of the body 102 in a side-by-side relationship. In other words, the arms 106*a*, 106*b* are oriented generally parallel to each other on opposing sides of the axis 22. The drill bit 98 is located between the arms 106*a*, 106*b*. In some embodiments, the hole cutter assembly 30 may only include one arm, or may include three or more arms.

The arms 106*a*, 106*b* are elongated members having generally hexagonal cross-sections. Each of the illustrated arms 106*a*, 106*b* includes a plurality of notches 158 and indicia 162. The notches 158 generally span the entire length of the arms 106*a*, 106*b* and are oriented such that the notches 158 are in facing relationship with the central aperture 130. In the illustrated embodiment, the notches 158 are defined generally as V-shaped notches. In other embodiments, the notches 158 may be differently configured (e.g., semi-circles). In the illustrated embodiment, the notches 158 of each arm 106*a*, 106*b* are spaced apart by approximately 1/8". In other embodiments, the notches 158 may be spaced apart differently (e.g., 1/16", 1/4", etc.). Likewise, the indicia 162 generally span the entire length of the arms 106*a*, 106*b*, but are orientated in facing relationship with the windows 138*a*, 138*b*. Each indicium 162 corresponds to individual notches 158 located on the arms 106*a*, 106*b*. In the illustrated embodiment, the indicia 162 are represented by a series of numbers identifying the diameter of cut the hole cutter assembly 30 will perform in inches. In other embodiments, the indicia 162 may represent a diameter of cut in metric units (e.g., centimeters).

The arms 106*a*, 106*b* also include stops 166*a*, 166*b* located at opposite ends relative to cutting blades 170*a*, 170*b*. The stops 166*a*, 166*b* are defined as fasteners that are coupled to ends of the arms 106*a*, 106*b* to prevent the arms 106*a*, 106*b* from being removed from their respective bores 134*a*, 134*b*. That is, the stops 166*a*, 166*b* inhibit the arms 106*a*, 106*b* from being pulled completely through the bores 134*a*, 134*b*. In the illustrated embodiments, the stops 166*a*, 166*b* are threaded screws. In other embodiments, the stops 166*a*, 166*b* may be shoulders or projections formed on or secured to the arms 106*a*, 106*b*.

The cutting blades 170*a*, 170*b* generally extend in the same direction as and are generally parallel to the drill bit 98. FIG. 8 illustrates the drill bit 98 extending past the cutting blades 170*a*, 170*b* by a distance 174. In the illustrated embodiment, the distance 174 is about 3/4". In other embodiments, the distance 174 may correspond to the thickness of the work piece 24. The cutting blades 170*a*, 170*b* also acts as a stop to prevent the arms 106*a*, 106*b* from being removed from their respective bores 134*a*, 134*b*. In addition, the cutting blades 170*a*, 170*b* are coupled to the arms 106*a*, 106*b* by threaded fasteners (e.g., screws) 176*a*, 176*b* such that the cutting blades 170*a*, 170*b* are removable from the arms 106*a*, 106*b* to facilitate replacement of the cutting blades 170*a*, 170*b*. As illustrated in FIG. 2, a portion of each cutting blade 170*a*, 170*b* defines a hexagonal shaped aperture that is received on the respective arms 106*a*, 106*b* to inhibit relative rotation between the cutting blades 170*a*, 170*b* and the arms 106*a*, 106*b*. The cutting blades 170*a*, 170*b* include cutting tips 178*a*, 178*b*. The cutting tip 178*a* is substantially aligned with the arm 106*a*, and the cutting tip 178*b* is substantially aligned with the arm 106*b*. Because the arms 106*a*, 106*b* are spaced apart from each other on opposing sides of the axis 22, the cutting tips 178*a*, 178*b* are also offset from each other when the hole cutter assembly 30 is viewed in FIG. 5. The cutting blades 170*a*, 170*b*, however, have sufficient widths so that edges of the blades 170*a*, 170*b* opposite the cutting tips 178*a*, 178*b* overlap, when viewed along the lengths of the arms 106*a*, 106*b*.

Assembly of the adjustable hole cutter system 10 prior to cutting a hole in the work piece 24 will be described in detail below. The hub 38 is assembled on the bowl 34 with the spring 90 positioned therebetween. In particular, the sidewalls 74 are received within the radial slots 62 so that the grooves 78 align with the fingers 66. When the hub 38 is secured to the bowl 34, the stops 82 contact the fingers 66 to inhibit removal of the hub 38 from the bowl 34. In other embodiments, the hub 38 may be removable from the bowl 34. In addition, when the hub 38 is secured to the bowl 34, the hub 38 is movable (e.g., slidable) along the rotational axis 22 relative to the bowl 34. The length of the sidewalls 74 are sized such that the movement of the hub 38 is limited relative to the bowl 34 by a set distance 182 (FIG. 8).

Before assembling the hole cutter assembly 30 with the shield assembly 26, a user first selects a desired diameter cut that the hole cutter assembly 30 performs on the workpiece 26. To select the desired diameter cut, the cutting blades 170*a*, 170*b* are moved relative to the axis 22. In the illustrated embodiment, the cutting blades 170*a*, 170*b* are fixed relative to the respective arms 106*a*, 106*b*. Therefore, to adjust the distance between the cutting blades 107*a*, 170*b*, the arms 106*a*, 106*b* are moved (e.g., slid) relative to the body 102. In the illustrated embodiment, the arms 106*a*, 106*b* are movable independently of each other. However, the cutting blades 170*a*, 170*b* are typically moved equal distances away from the axis 22 so that the hole cutter assembly 30 is balanced and cuts a constant diameter hole into a work piece.

As the arms 106*a*, 106*b* move, the indicia 162 on the arms 106*a*, 106*b* are monitored through the windows 138*a*, 138*b* until the pointers 142*a*, 142*b* align with the desired indicium 162. As described above, the indicia 162 identifies the diameter of cut. Therefore, if the pointers 142*a*, 142*b* align with the indicium 162 identified as a six (FIG. 5), then the hole cutter assembly 30 will perform a six inch diameter cut. In the illustrated embodiment, the hole cutter assembly 30 can cut a diameter varying from a two inch diameter cut to a seven inch diameter cut. In other embodiments, the hole cutter assembly 30 may cut diameters smaller than two inches and greater than seven inches.

In addition, as the arms 106*a*, 160*b* move relative to the body 102, the detent assemblies 150*a*, 150*b* in the body 102 individually engage the notches 158 in the arms 106*a*, 106*b*. As described above, the notches 158 on each arm 106*a*, 106*b* are spaced at 1/8" intervals. Therefore, the detent assemblies 150*a*, 150*b* provide positive feedback at every 1/8" to easily and accurately select a desired diameter of cut. In addition, the detent assemblies 150*a*, 150*b* help releasably hold the arms 106*a*, 106*b* at discrete positions. As both arms 106*a*, 106*b* move in increments of 1/8", the total diameter of cut (e.g., distance between the cutting blades 170*a*, 170*b*) increments by 1/4".

Once the diameter of cut is selected, the drill bit 98 is inserted into the central aperture 130 of the body 102. The drill bit 98 engages the arms 106a, 106b so that the arms 106a, 106b are fixed (i.e., not movable) relative to the body 102 when the drill bit 98 is received in the aperture 130. Consequently, the cutting blades 170a, 170b are locked in position at the desired diameter. This allows for a tool-less operation to alter the diameter of cut desired. In other words, a user does not need to use a tool (e.g., a screwdriver or an Allen wrench) to change and adjust the diameter of cut to be performed by the hole cutter assembly 30. Instead, the user can simply remove the drill bit 98 from the body 102 to allow movement of the arms 106a, 106b, and can reinsert the drill bit 98 into the body 102 to inhibit movement of the arms 106a, 106b. The drill bit 98 is releasably secured in place by the quick release mechanism on the arbor 94. As shown in FIG. 6, a portion of the attachment end 110 of the drill bit 98 engages one of the notches 158 in each arm 106a, 106b through the openings 146a, 146b. As such, the arms 106a, 106b are inhibited from movement relative to the body 102. In addition, the drill bit 98 is fully inserted within the central aperture 130 when the shoulder 118 abuts a portion of the body 102, enabling the distance 174 to remain constant. Likewise, the shoulder 118 enables an optimum length of the working end 114 that extends beyond the bowl 34.

In other embodiments, the drill bit 98 may be movable relative the body 102 between a first position and a second position to selectively lock the movement of the arms 106a, 106b relative to the body 102. For example, when the drill bit 98 is in the first position, the arms 106a, 106b are fixed relative to the body 102. When the drill bit 98 is in the second position, the arms 106a, 106b are moveable relative to the body 102. In both positions, however, the drill bit 98 remains coupled to and supported by the body 102. The drill bit 98 may be selectively rotated, translated, or the like between the first position and the second position.

Once the drill bit 98 is fully inserted within the central aperture 130, the working end 126 of the arbor 94 is inserted onto the attachment end 110 of the drill bit 98. As a result, the body 102 is captured between the attachment end 122 of the arbor 94 and the shoulder 118 of the drill bit 98.

The hole cutter assembly 30 is then coupled to the debris shield assembly 26. Specifically, the arbor 94 is inserted through the central aperture 58 of the bowl 34 and into the hub 38 such that a portion of the attachment end 122 extends through the bushing 86. The bushing 86 surrounds a portion of the arbor 94 to facilitate rotation of the arbor 94 (and thereby the hole cutter assembly 30) relative to the debris shield assembly 26. In this orientation, the hole cutter assembly 30 rotates relative to the debris shield assembly 26. In particular, the bushing 86 is in communication with the attachment end 122 to provide a relatively low frictional engagement between the hole cutter assembly 30 and the debris shield assembly 26.

Once the hole cutter assembly 30 is coupled to the debris shield assembly 26, the drive portion 18 of the power tool 14 engages the attachment end 122 of the arbor 94. As such, the drive portion 18 rotatably operates the hole cutter assembly 30.

In operation, a center (i.e., the origin) of a desired hole on the work piece 24 is aligned with the working end 114 of the drill bit 98. As the power tool 14 is actuated, the drive portion 18 of the power tool 14 rotates the hole cutter assembly 30, and the working end 114 of the drill bit 98 initially penetrates the work piece 24 while the debris shield assembly 26 remains stationary. When the power tool 14 is translated (e.g., pushed or guided by a user) towards the work piece 24, the hub 38 also translates towards the work piece 24 and into the bowl 34. As described above, the sidewalls 74 are sized to limit the sliding movement between the hub 38 and the bowl 34. Similarly, this acts as a stop to limit penetration of the hole cutter assembly 30 into the work piece 24 to the set distance 182 (FIG. 8). As the power tool 14 is translated closer to the work piece 24, the cutting tips 178a, 178b begin to cut the desired diameter hole in the work piece 24. Consequently, debris from the cutting operation is entrapped within the bowl 34. Also, the rotational movement of the hole cutter assembly 30 creates an airflow current within the bowl 34. The steps 50 of the bowl 34 are constructed to interrupt the airflow current such that the debris is collected within the channel 54. As debris collects within the channel 54, visibility of the cut being performed is not obstructed through the area of the bottom wall 46 inside the perimeter defined by the channel 54.

When the cutting blades 170a, 170b complete the cut of the hole and the adjustable hole cutter system 10 is moved away from the work piece 24, the spring 90 biases the bowl 34 back to its original position (e.g., before the cut of the hole initiated). Therefore, the adjustable hole cutter system 10 is ready to cut another hole. However, if a different sized hole is desired, the hole cutter assembly 30 is disassembled from the power tool 14 and the debris shield assembly 26 such that the drill bit 98 can be removed from the body 102 to adjust the distance between the cutting blades 170a, 170b (i.e., diameter of a desired cut), as described above. In other embodiments, the diameter of the hole cutter assembly 30 may be adjusted when the debris shield assembly 26 is coupled to the power tool 14. For example, the arbor 94 may be differently constructed such that the debris shield assembly 26 and the arbor 94 remain coupled to the power tool 14 as the drill bit 98 is removed from the body 102.

Although the invention has been described in detail with reference to certain preferred embodiments, variations and modifications exist within the scope and spirit of one or more independent aspects of the invention as described. Various features and advantages of the invention are set forth in the following claims.

The invention claimed is:

1. A hole cutter assembly operable to cut a plurality of different sized diameter holes in a work piece, the hole cutter assembly comprising:
   an arbor configured to connect to a power tool for rotation about an axis;
   a body coupled to the arbor for rotation with the arbor;
   a first arm moveably coupled to the body, the first arm extending generally perpendicular to the axis;
   a first cutting blade coupled to the first arm and moveable with the first arm relative to the body;
   a second arm moveably coupled to the body, the second arm extending generally perpendicular to the axis; and
   a second cutting blade coupled to the second arm and moveable with the second arm relative to the body;
   wherein the first arm and the second arm are oriented generally parallel to each other on opposing sides of the axis;
   wherein the body defines an aperture, and further comprising a drill bit removably received in the aperture for rotation with the arbor; and
   wherein each arm includes a plurality of notches formed along a length of the arm, wherein each notch selectively aligns with the aperture as the first and second arms move relative to the body, and wherein, when the drill bit is received within the aperture, a first portion of the drill bit is received in the notch of the first arm that is aligned with the aperture to inhibit movement of the first arm relative to the body, and a second portion of the drill bit is received in the notch of the second arm that is aligned with the aperture to inhibit movement of the second arm relative to the body.

2. The hole cutter assembly of claim 1, wherein the first arm is movable relative to the body independently of the second arm.

3. The hole cutter assembly of claim 1, wherein the drill bit includes a shoulder that abuts the body to capture the body between the drill bit and the arbor.

4. The hole cutter assembly of claim 1, wherein the body includes a first detent assembly that engages the first arm to releasably hold the first arm in a plurality of discrete positions, and a second detent assembly that engages the second arm to releasably hold the second arm in a plurality of discrete positions.

5. The hole cutter assembly of claim 1, wherein the body defines a window, wherein the first arm includes indicia viewable through the window of the body, and wherein the indicia correspond to different sized diameter holes.

* * * * *